United States Patent
Suzuki et al.

(10) Patent No.: US 6,362,603 B2
(45) Date of Patent: Mar. 26, 2002

(54) BATTERY CHARGING APPARATUS

(75) Inventors: Hidetoshi Suzuki; Hiroyuki Horibe; Takuma Ayuzawa; Masahiko Yamaguchi, all of Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/780,905

(22) Filed: Feb. 9, 2001

(30) Foreign Application Priority Data

Feb. 16, 2000 (JP) ......................................... 2000-038638

(51) Int. Cl.[7] .............................. H02J 7/00; H02J 7/04; H02J 7/16
(52) U.S. Cl. ..................... 320/163; 320/152; 320/153; 320/162; 320/163
(58) Field of Search ................................ 320/134, 162, 320/163, 152, 153, 150; 322/28; 357/10.7

(56) References Cited

U.S. PATENT DOCUMENTS

| | | | | |
|---|---|---|---|---|
| 4,281,279 A | * | 7/1981 | Gurwicz | 320/141 |
| 4,398,140 A | * | 8/1983 | Morishita | 320/150 |
| 4,852,540 A | * | 8/1989 | Safranek | 123/599 |
| 5,023,539 A | * | 6/1991 | Miller et al. | 322/28 |
| 5,231,344 A | * | 7/1993 | Marumoto et al. | 322/14 |

FOREIGN PATENT DOCUMENTS

| JP | 144542/1987 | 6/1987 |
|---|---|---|
| JP | 22462/1993 | 3/1993 |
| JP | 2000-278879 | 10/2000 |

* cited by examiner

Primary Examiner—Gregory Toatley
(74) Attorney, Agent, or Firm—Pearne & Gordon LLP (57) ABSTRACT

A battery charging apparatus comprising a controller to control on-off controllable switch elements of an AC power source output short circuit and including a first control section to control the on-off controllable switch elements so that they are at an on-state when an instantaneous terminal voltage of a battery exceeds a first set value and a second control section to control the on-off switch elements so that they are at an on-state when an average voltage of the battery exceeds a second set value and serving to control them when a power source switch is closed.

22 Claims, 3 Drawing Sheets

BATTERY CHARGING APPARATUS

TECHNICAL FIELD OF THE INVENTION

This invention pertains to a battery charging apparatus for charging a battery by a rectified output from a magneto generator driven by a primer such as an internal combustion engine and so on.

BACKGROUND OF THE INVENTION

The battery charging apparatus mounted on a motor bicycle or the like driven by an internal combustion engine comprises a magneto generator driven by the internal combustion engine, a rectifier circuit having input terminals connected to output terminals of the generator and output terminals between which the battery is connected, an output short circuit having on-off controllable switch elements to short the output terminals of the magneto generator when the switch elements are at an on-state and a controller to control the switch elements of the output short circuit in accordance with an output voltage of the battery.

Figure 3:
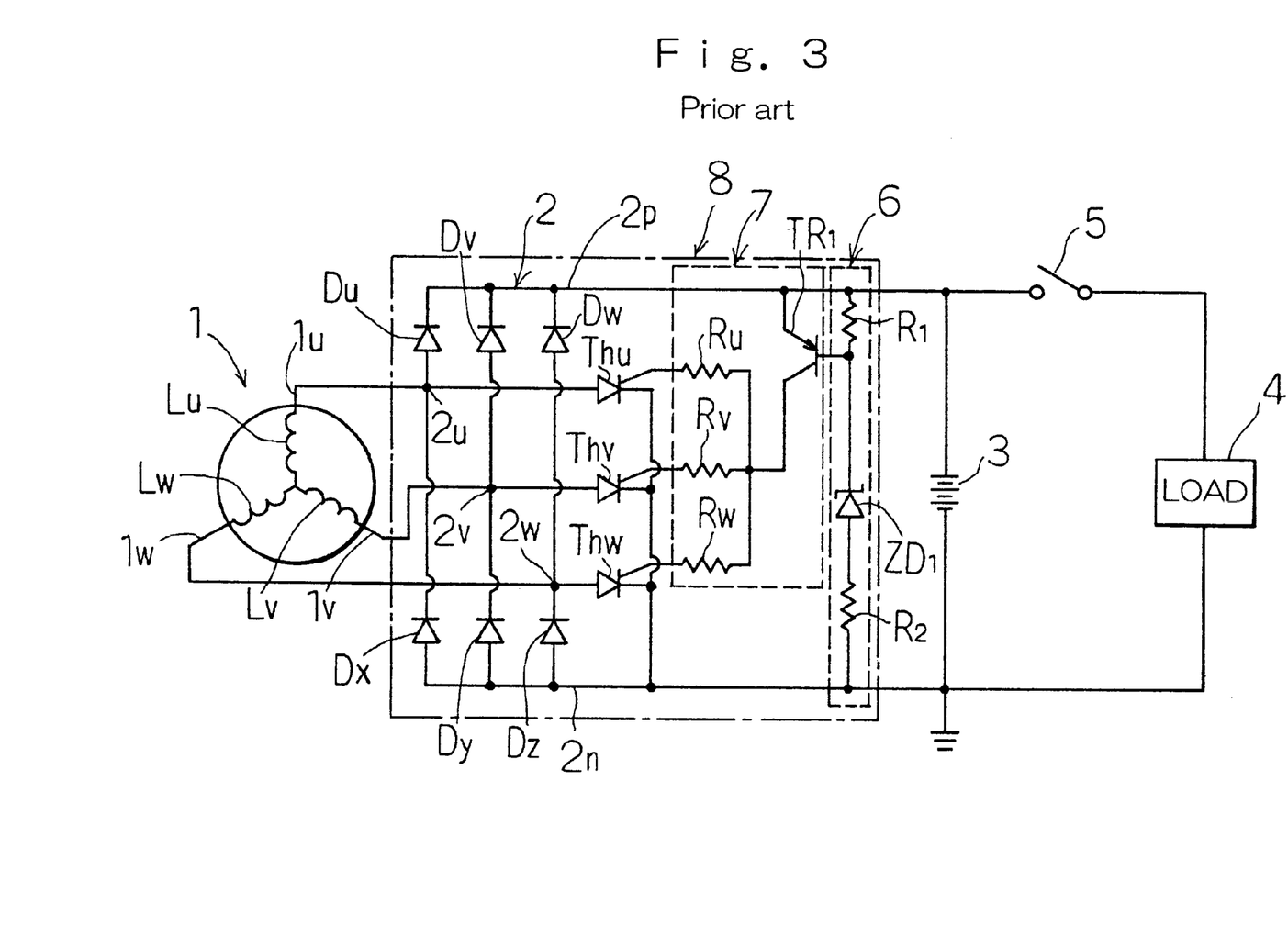
FIG. 3 is a schematic diagram of a prior art battery charging apparatus.

An example of the prior art battery charging apparatus is shown in FIG. 3. A magneto generator 1 generates an AC voltage by being driven by an internal combustion engine mounted on a vehicle such as a motor bicycle or the like. The magneto generator 1 comprises a not shown magnet rotor mounted on a crankshaft of the internal combustion engine and a stator having three phase generation coils Lu through Lw.

A rectifier circuit 2 to rectify an output of the generator 1 comprises a three-phase bridge circuit of diodes Du through Dw and Dx through Dz connected to each other in a bridged manner. AC input terminals 2u through 2w of the rectifier circuit 2 are formed of respective connection points of the diodes Du through Dw for an upper arm of the bridge circuit and the diodes Dx through Dz for a lower arm of the bridge circuit while positive and negative DC output terminals 2p and 2n of the rectifier circuit 2 are formed of the common connection point of the cathodes of the upper arm diodes and the common connection point of the anodes of the lower arm diodes, respectively. The AC three-phase input terminals 2u through 2w of the rectifier circuit 2 are connected to the output terminals 1u through 1w of the generator, respectively, while the battery 3 is connected across the DC output terminals 2p and 2n of the rectifier circuit 2.

A load 4 is connected through a power source switch 5 to both ends of the battery 3. An overvoltage detection circuit 6 serves to detect a terminal voltage of the battery 3 to generate an overvoltage detection signal when an instantaneous value of the detected terminal voltage exceeds a set value.

Thyristors Thu through Thw serve as output shorting switch elements with cathodes thereof commonly connected to the negative output terminals of the rectifier circuit 2 and with anodes thereof connected to the AC input terminals 2u through 2w of the rectifier circuit 2, respectively.

In this example, an output short circuit is formed by the diodes Dx through Dz and the thyristors Thu through Thw. When control signals are applied to the thyristors Thu through Thw, the thyristors having forward voltages applied across the anode and cathode thereof among these thyristors become an on-state and the generator is shorted between the output terminals 1u and 1v, 1v and 1w and 1w and 1u of the U, V and W phases of the generator through the on-state thyristors and the diodes Dx through Dz.

The overvoltage detection circuit 6 comprises a voltage divider circuit formed of a series circuit of a first divider resistor R1, a Zener diode ZD1 and a second voltage divider circuit R2 and connected in parallel to both sides of the battery 3 with the cathode of the Zener diode ZD1 directed to the positive side of the battery 3. The overvoltage detection circuit 6 conducts the Zener diode ZD1 when the instantaneous value of the terminal voltage of the battery 3 exceeds the set value to generate an overvoltage detection signal.

To the connection point of the resistor R1 and the Zener diode ZD1 of the overvoltage detection circuit 6 is connected a base of a PNP transistor TR1 having an emitter connected to the DC output terminals 2p of the rectifier circuit 2 while a collector of the transistor TR1 is connected through resistors Ru through Rw to gates of the thyristors Thu through Thw.

In this example, a switch trigger circuit 7 that applies to the respective thyristors trigger signals for conducting the thyristors Thu through Thw comprises the transistor TR1 and the resistors Ru through Rw. The switch trigger circuit 7 applies the trigger signals to the thyristors Thu through Thw when the terminal voltage of the battery exceeds the set value and thereby the Zener diode ZD1 is turned on to apply the trigger signals to the thyristors Thu through Thw.

In the example of FIG. 3, a regulator circuit 8 having a rectifying function and a voltage regulating function is constituted by the rectifier circuit 2, the output short circuit comprising the low arm diodes Dx through Dz of the bridge of the rectifier circuit 2 and the thyristors Thu through Thw, the overvoltage detection circuit 6 and the switch element trigger circuit 7. The regulating circuit 8 and the generator 1 constitutes the battery charging apparatus.

In the battery charging apparatus shown in FIG. 3, the DC voltage is applied to the battery 3 from the generator 1 through the rectifier circuit 2 to thereby charge the battery 3. The DC voltage (the battery terminal voltage) applied from the rectifier circuit 2 to the battery includes a ripple voltage having a waveform corresponding to that of the AC voltage output from the generator 1. The overvoltage detection circuit 6 applies the trigger signals to the thyristors Thu through Thw when the instantaneous value of the battery terminal voltage including the ripple voltage exceeds the set value.

As the instantaneous value of the terminal voltage of the battery 3 is equal to or less than the set value, the transistor TR1 turns into an off-state because the Zener diode ZD1 of the overvoltage detection circuit 6 is at a nonconductive state and therefore the thyristors Thu through Thw are at an off-state. In these states, the output of the generator 1 is rectified by the rectifier circuit 2 and supplied to the battery 3 so that it is charged. Since the power source switch 5 is closed during the operation of the internal combustion engine, the electric power is supplied from the battery to the load 4.

As the instantaneous value of the terminal voltage of the battery 3 exceeds the set value, the Zener diode ZD1 gets turned on so that the transistor TR1 becomes the on-state because of the base current flowing through the transistor TR1 and as a result, the trigger signals are applied from the battery 3 through the transistor TR1 to the thyristors Thu through Thw. At that time, the thyristors Thu through Thw are conducted while the forward voltages are applied between the anodes and the cathodes thereof and the output terminals of the generator 1 are shorted through either of the conducting thyristors and the lower arm diodes Dx through Dz of the bridge of the rectifier circuit 2. For instance, the thyristor Thu is at the on-state while the output terminal 1u of the generator 1 is at high potential relative to the other output terminals 1v and 1w. At that time, the output terminals 1u and 1v of the generator 1 are shorted through the thyristor Thu and the diode Dy and the output terminals 1u and 1w of the generator 1 are shorted through the thyristor Thu and the diode Dz.

In this manner, since the voltage is never applied from the generator 1 to the rectifier circuit 2 while the output terminals of the generator 1 are shorted, the charging current is prevented from flowing from the rectifier circuit 2 to the battery so that the terminal voltage of the battery is lowered. As the terminal voltage of the battery 3 is equal to or less than the set value, the Zener diode ZD1 becomes the nonconductive state and therefore the transistor TR1 turns into the off-state. Thus, the trigger signals stop being supplied to the thyristors Thu through Thw so that the charging current is again supplied from the rectifier circuit 2 to the battery 3. The terminal voltage of the battery 3 is maintained equal to or less than the set value by repeating this operation.

In the aforementioned battery charging apparatus, when the instantaneous value of the ripple voltage included in the DC voltage applied from the rectifier circuit 2 to the battery 3 exceeds the set value, the Zener diode ZD1 becomes conductive and the trigger signals are applied to the thyristors Thu through Thw so that the voltage regulating operation can be made.

In this case, since the ripple voltage rises abruptly while the revolution of the generator is high, the thyristors Thu through Thw are triggered immediately after the ripple voltage rises and therefore the voltage regulating operation is done at earlier timing. On the other hand, since the ripple voltage rises slowly while the revolution of the generator is low, the thyristors Thu through Thw are triggered in a delayed manner and therefore the voltage regulating operation starts at a delayed time.

Accordingly, it is required for the set value to be set at relatively high level in order to properly control the terminal voltage of the battery when the generator rotates at a high speed, but this sometimes causes the battery terminal voltage to increase when the generator rotates at low speed which delays the start of the voltage regulating operation after the ripple voltage rises.

On the other hand, it is required for the set value to be set at a relatively low level in order to properly control the terminal voltage of the battery when the generator rotates at the low speed, but this disadvantageously prevents the battery from being fully charged because the battery terminal voltage decreases due to the voltage regulating operation starting too early when the generator rotates at the high speed. Particularly, in case that an impedance of the circuit connecting the rectifier circuit and the battery is high, the voltage applied to the battery during the high speed rotation decreases and therefore the battery is insufficiently charged.

As aforementioned, since the prior art battery charging apparatus adversely affects the voltage regulating operation during the steady state of the generator due to the ripple voltage included in the voltage applied from the rectifier circuit to the battery, the circuit constant should be adjusted according to the magnitude of the ripple voltage during the steady operation. However, since the magnitude of the ripple voltage is determined on the winding specification of the generator, the capacity of the battery and the kinds of the load, the circuit constant is required to be set in accordance with the winding specification of the generator, the capacity of the battery and the kinds of the load. This disadvantageously causes the design and manufacture of the battery charging apparatus to be troublesome.

SUMMARY OF THE INVENTION

Accordingly, it is a principal object of the invention to provide a battery charging apparatus adapted to charge a battery in a preferable manner without being affected by the winding specification of the generator, the capacity of the battery and the kinds of the load.

In accordance with the present invention, there is provided a battery charging apparatus comprising a magneto AC generator, a rectifier circuit having input terminals connected to output terminals of the generator, an output short circuit having on-off controllable switch elements and shorting the output terminals of the magneto AC generator when the switch elements are at an on state and a controller to control the switch elements of the output short circuit in accordance with the terminal voltage of the battery, the controller including a first switch control section to control the switch elements of the output short circuit to be turned on when the instantaneous value of the terminal voltage of the battery exceeds a first set value, an average voltage detection circuit to detect an average value of the terminal voltage of the battery, a second switch control section to control the switch elements of the output short circuit so as to be turned on when the average value of the terminal voltage of the battery exceeds a second set value and control change-over means to change the controls by the first control section and the second control sections from one to the other so that the switch elements are controlled by the second control section when an electric power is supplied from the battery to the load and so that the switch elements are controlled by the first control section when the load is cut out from the battery.

With the battery charging apparatus constructed in the aforementioned manner, since the switch elements of the output short circuit is controlled by the second switch control section during the steady operation in which the electric power is supplied from the generator to the load, the voltage regulating operation is made to short the output voltage of the magneto generator when the average value of the battery terminal voltage reaches the second set value.

As the load is cut out from the generator when the operation of the generator stops, the voltage regulating operation is done by the first switch control section in accordance with the instantaneous value of the battery terminal voltage during the short period until the generator stops.

As the average value of the battery terminal voltage is detected when the generator is steadily operated and the voltage is so adjusted that the average value thereof never exceeds the set value, the charging voltage for the battery can be steadily controlled without being adversely affected by the ripple voltage having the peak value varying on the changing revolution of the generator.

Since the ripple voltage does not affect the voltage adjustment, the constant of the circuit is not required to be adjusted in accordance with the winding specification of the generator, the capacity of the battery and the kinds of the load, which enables the battery charging apparatus to be manufactured more easily.

Even though the impedance of the circuit connecting the rectifier circuit and the battery is high, the appropriate range of the voltage applied to the battery can be maintained by properly setting the second set value when the generator is driven not only with the low revolution, but also with the high revolution. Thus, the battery can be prevented from being insufficiently charged.

The first switch control section is adapted to directly detect the terminal voltage of the battery across both ends thereof and the average voltage detection circuit serves to detect the average value of the terminal voltage of the battery across both ends thereof when the load is connected through the power source switch to the battery. As the first set value is so set to be higher than the instantaneous value of the terminal voltage of the battery within the range over which the battery and the load are never adversely affected when it reaches the second value, the control by the first switch control section and the control by the second switch control section can be automatically changed. Thus, it will be noted that the power source switch constitutes the control change-over means.

In this case, both of the first and second switch control sections detect the terminal voltage of the battery while the load is connected to the battery, but since the first set value is so set to be higher than the instantaneous value of the battery terminal voltage when the average value of the battery terminal voltage reaches the second value. Thus, it will be noted that while the load is connected to the battery, the average value of the terminal voltage detected by the average voltage detection circuit exceeds the second value so that the second switch control section turns on the switch elements of the output short circuit before the first switch control section turns on the switch elements of the output short circuit. In this manner, the second switch control section controls the switch elements of the output short circuit on the steady operation of the generator whereby the voltage adjustment operation is made so that the average value of the battery terminal voltage can be maintained equal to or less than the second set value.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Figure 1:
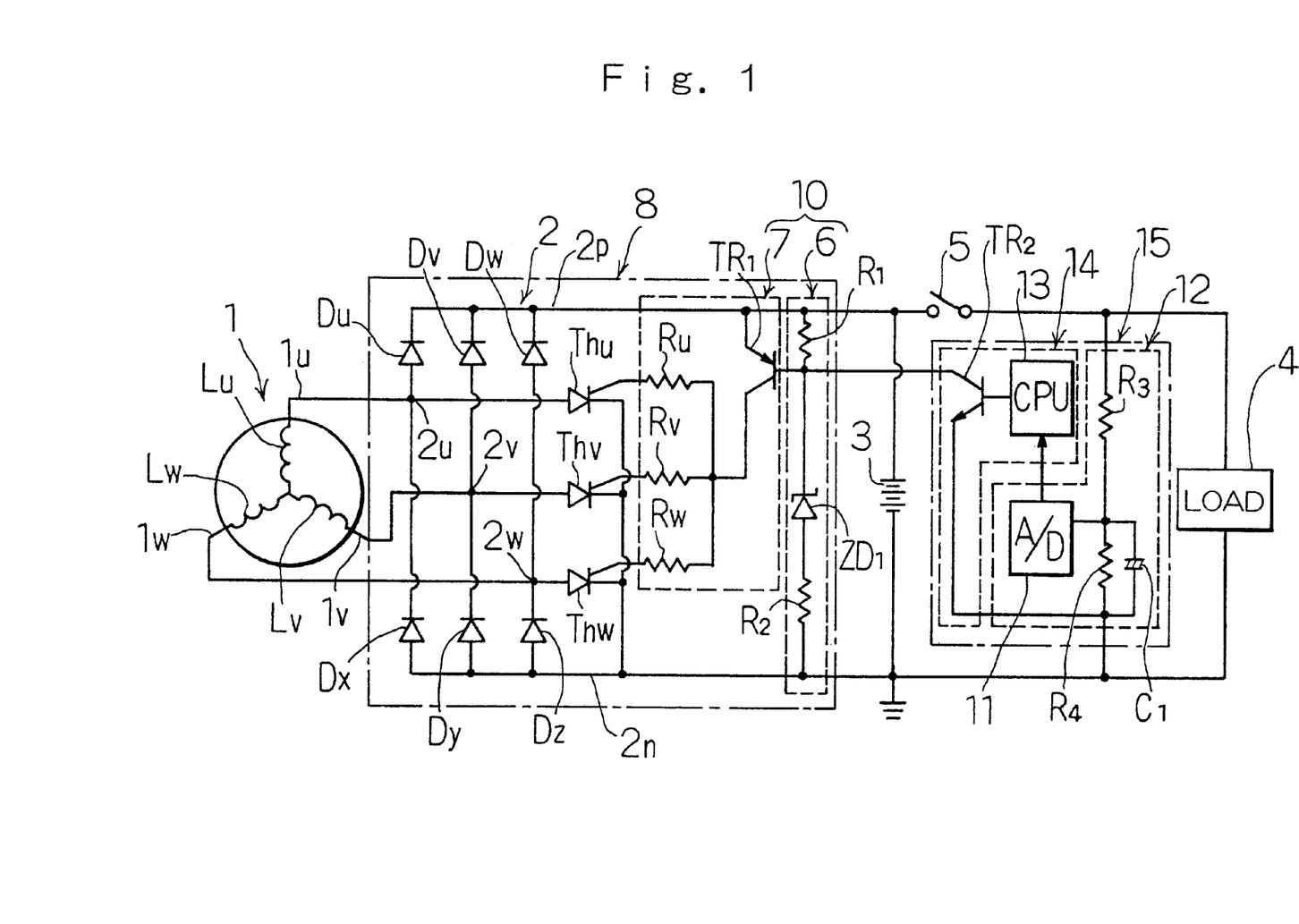
FIG. 1 is a schematic diagram of a battery charging apparatus constructed in accordance with an embodiment of the invention.

Referring now to FIG. 1, there is shown a battery charging apparatus constructed in accordance with one embodiment of the invention. A magneto AC generator 1 is driven by an internal combustion engine mounted on a vehicle such as a motor bicycle or the like so as to generate a three-phase AC voltage. A rectifier circuit 2 has three-phase AC input terminals 2u through 2w connected to output terminals 1u through 1w of the generator to rectify an output of the generator. A battery 3 is connected between DC output terminals 2p and 2n of the rectifier circuit 2 to be charged through the rectifier circuit 2 by the output of the generator 1. A load 4 may be connected through a power source switch 5 to both ends of the battery 3. A negative terminal of the battery is grounded to earth. The power source switch 5 may comprise a conventional key switch that is closed when the internal combustion engine is to be driven and opened when the internal combustion engine stops.

The generator 1 comprises a magnet rotor mounted on a crankshaft of the internal combustion engine and a stator having three-phase generation coils Lu through Lw wound on an armature core. The generator may be displaced within a cover mounted on a crankcase of the engine so that lubrication oil for the engine may be sprayed against and cool the generation coils Lu through Lw.

The rectifier circuit 2 may be identical to that shown in FIG. 3 and comprises the diodes Du through Dw and Dx through Dz. The thyristors Thu through Thw as output shorting switch elements have anodes connected to the AC input terminals 2u through 2w and cathodes commonly connected to the negative output terminal of the rectifier circuit 2. The thyristors Thu though Thw are connected in reverse parallel to the diodes Dx through Dz for the upper arm of the rectifier circuit 2. The output short circuit is constituted by these thyristors Thu through Thw and the diodes Dx through Dz in a manner similar to that of FIG. 3. In the output short circuit, when a control signal is applied to the thyristors Thu through Thw, the thyristor having a forward voltage applied across the anodes and the cathodes thereof are turned on. When either of the thyristors Thu through Thw is turned on, the output terminals 1u and 1v, 1v and 1w or 1w and 1u among the three-phase U, V and W output terminals of the generator 1 are shorted through the on-state thyristors and the diodes Dx through Dz.

An overvoltage detection circuit 6 may comprise a first voltage divider resistors R1 having one end connected to a positive terminal of the battery 3, a Zener diode ZD1 having an anode connected in series to the first voltage divider resistor R1 while being provided between the first voltage divider resistor R1 and the negative terminal of the battery 3 with the anode faced to the negative terminal of the battery 3 and a second voltage divider resistor R2 connected in series to the Zener diode ZD1 and the first voltage divider resistor R1 while being provided between the other end of the first voltage divider resistor R1 and the negative terminal of the battery 3.

A switch element trigger circuit 7 serves to apply trigger signals to the thyristors Thu through Thw when the overvoltage detection circuit 6 generates an overvoltage detection signal and may comprises a PNP transistor TR1 having a base connected to a connection point of the first resistor R1 and the Zener diode ZD1 and an emitter connected to the positive DC output terminal 2p of the rectifier circuit 2 and resistors Ru though Rw connected between a collector of the transistor TR1 and gates of the thyristors Thu through Thw.

In the embodiment of FIG. 1, a first switch control section 10 may be formed of the overvoltage detection circuit 6 and the switch trigger circuit 7 and serves to control the switch elements Thu through Thw of the output short circuit to be turned on when the instantaneous value of the terminal voltage of the battery 3 exceeds the first set value. The first switch control section and the output short circuit constitute a load disconnection overvoltage protection circuit 10. This load disconnection overvoltage protection circuit and the rectifier circuit 2 constitute a regulator circuit 8.

One end of a resistor R3 is connected to one end of the load 4 connected through the power source switch 5 to the positive terminal of the battery 3 and a resistor R4 is connected between the other end of the resistor R3 and the negative terminal of the battery 3. A smoothing capacitor C1 is connected to both ends of the resistor R4 and a voltage across the capacitor C1 is input to an analog-digital (A/D) converter 11. The resistors R3 and R4, the capacitor C1 and the A/D converter 11 constitute an average voltage detection circuit 12 to detect the average value of the terminal voltage of the battery 3.

An output of the A/D converter 11 is input to a CPU 13 of a microcomputer. To an output port of the CPU 13 is connected a base of a transistor TR2 having an emitter connected to the negative terminal of the battery and a collector connected to the base of the transistor TR1.

In the embodiment of FIG. 1, the microcomputer having the CPU 13 and the transistor TR2 constitute a second switch control section 14 that controls the switch elements of the output short circuit so as to be turned on when the average value of the battery 3 detected by the average voltage detection circuit 12 exceeds the second set value. The second switch control section 14 and the average voltage detection circuit 12 constitute a steady operation battery charging apparatus 15.

The CPU 13 arithmetically compares the average value of the terminal voltage of the battery detected by the average voltage detection circuit 12 with the second set value to repetitively generate an on-instruction signal having a frequency sufficiently higher than output frequency of the generator when the average value of the battery terminal voltage exceeds the second set value. The on-instruction signal is applied to the base of the transistor TR2. As the on-instruction signal is applied, the transistor TR2 is turned on and therefore the transistor TR1 is also turned on. Thus, the trigger signal is applied to the switch elements Thu through Thw of the output short circuit.

In the battery charging apparatus of FIG. 1, the first set value providing a voltage adjusting value of the first switch control section is so set to be higher than the instantaneous value of the battery terminal voltage when the average value of the battery terminal voltage reaches the second set value within a range over which the battery 3 and the load 4 are not adversely affected.

Accordingly, in the condition that the power source switch 5 is closed, as the average value of the terminal voltage of the battery 3 exceeds the second value, the CPU 13 supplies the base current to the transistor TR2 so that it is turned on. Thus, the transistor TR1 is also turned on and the trigger signal is applied to the thyristors Thu through Thw so that they are turned on. In this manner, the output terminals of the generator are shorted so that the terminal voltage of the battery 3 is lowered. As the terminal voltage of the battery 3 gets equal to or less than the second set value, the base current no longer flows from the CPU 14 to the transistor TR2. Thus, the transistor TR2 is turned off and therefore the trigger signal stops being supplied to the thyristors Thu through Thw. Thus, the charging current again flows from the rectifier circuit 2 to the battery 3. This operation is repeated and as a result the average value of the terminal voltage of the battery 3 is kept adjacent to the second set value.

As the power source switch (or the key switch) 5 is opened in order to stop the internal combustion engine, the load 4 is disconnected from the battery 3. The internal combustion engine is rotating for a while even after the switch 5 is opened. At that time, as the terminal voltage of the battery 3 exceeds the first set value, the Zener diode ZD1 is conducted and therefore the transistor TR1 is turned on. This causes the thyristors Thu through Thw to be conducted so that the output terminals of the generator 1 are shorted and the terminal voltage of the battery is lowered.

In the embodiment of FIG. 1, the second switch control section is provided with the microcomputer, which is used for changing the second value in accordance with various control conditions so that the battery charging apparatus has various additional functions, which will be described later.

As aforementioned, in many cases, the magneto AC generator is driven by the internal combustion engine as a drive power source. As the generation coils are shorted on the voltage adjustment, the generator generates much brake torque, which causes the generator to be much load to the internal combustion engine. Thus, as the voltage adjustment operation is made when the internal combustion engine is accelerating, the engine will possibly have poor acceleration characteristics.

In order to avoid such a problem, there may be provided acceleration condition detection means including a throttle sensor to detect an opening degree of a throttle valve and a revolution sensor to provide the revolution information such as the rotary angle information of the engine and the rotation speed information of the engine to detect that the internal combustion engine is accelerating from the rotation speed of the internal combustion engine and the opening degree of the throttle by inputting the outputs of the sensors to the CPU 13 and practicing the predetermined program stored in ROM of the CPU 13 and set value change-over means to change the second set value to a larger value when the acceleration condition detection means detects that the internal combustion engine is in the acceleration condition. The acceleration condition detection means and the set value change-over means may be preferably a component element of the controller for the battery charging apparatus.

In this manner, as the second set value is changed to the larger value when the internal combustion engine is in the acceleration condition, little operation of the voltage adjustment on the acceleration of the engine can be made and therefore the generator can be prevented from applying much load to the internal combustion engine. This enables improved acceleration characteristics of the engine.

In case that the internal combustion engine is used for the drive power source of the generator, there may be provided deceleration condition detection means to detect that the internal combustion engine is decelerating from the rotation speed of the internal combustion engine and the opening degree of the throttle by practicing the predetermined program in the CPU 13 and set value change-over means to change the second set value to a smaller value when the deceleration condition detection means detects that the internal combustion engine is in the deceleration condition. In the same manner, the deceleration condition detection means and the set value change-over means may be also preferably a component element of the controller of the battery charging apparatus.

In this manner, as the second set value is changed to the smaller value when the internal combustion engine is in the deceleration condition, the generator is kept in the condition of being shorted on the deceleration of the engine so that the generator can generate much brake torque. This enables to improve deceleration characteristics of the engine.

In order to improve both of the acceleration characteristics and the deceleration characteristics of the engine, there can be provided acceleration/deceleration condition detection means to detect that the internal combustion engine is accelerating or decelerating from the rotation speed of the internal combustion engine and the opening degree of the throttle by practicing the predetermined program in the CPU 13 and set value changeover means to change the second set value to the larger value when the acceleration/deceleration condition detection means detects that the internal combustion engine is in the acceleration condition and to change the second set value to the smaller value when the acceleration/deceleration condition detection means detects that the internal combustion engine is in the deceleration condition. The acceleration/deceleration condition detection means and the set value change-over means may be preferably a component element of the controller of the battery charging apparatus.

In some cases, the battery charging apparatus may be formed so that the generation coils are cooled by the lubrication oil for the internal combustion engine as in the aforementioned embodiment. In this case, there may be provided an oil temperature sensor or oil temperature detection means to detect a temperature of the lubrication oil for the internal combustion engine and set value change-over means to change the set value to a larger value when the temperature of the oil detected by the oil temperature detection means exceeds the set value can be practiced by the CPU 13 for a further component element of the controller.

In this manner, as the second set value is changed to the larger value when the oil temperature exceeds the set value, the voltage adjustment operation will be made with lower frequency and therefore heat from the generation coils will be generated in lower degree. Thus, the temperature of the generation coils can be lowered.

In general, when the battery is charged at low atmospheric temperature, the battery is charged with poor charging characteristics. Thus, the voltage applied to the battery is required to get higher in order to properly charge the battery. Therefore, when the atmospheric temperature is low, the set value providing an upper limit of the battery terminal voltage is desirably higher.

In this case, a temperature sensor may be provided which detects an atmospheric temperature at which the battery is charged and set value arithmetical operation means may be practiced by the CPU 13 to arithmetically operate the second value providing a limit value for the average value of the battery terminal voltage relative to the atmospheric temperature of the battery. The second switch control section is preferably constructed so as to turn on the switch elements of the output short circuit when the average value of the terminal voltage detected by the average voltage detection circuit exceeds the second set value obtained by being arithmetically operated in accordance with the atmospheric temperature. The set value arithmetical operation means may be constructed so that the second set value is a larger value at the lower atmospheric temperature while it is a smaller value as the atmospheric temperature increases.

In this invention, the first switch control section 10 serves to prevent the overvoltage from being applied across the battery 3 while the generator 1 is cut from the load 4 so as to stop the operation thereof In the battery charging apparatus to which the invention is applied, it will be considered that the first switch control section may be omitted and only then second switch control section may be provided to adjust the charging voltage in accordance with the average value of the battery terminal voltage. In this case, the average voltage detection circuit is required to be connected to both ends of the battery in order to protect the battery from the overvoltage when the generator is cut from the load and stops the operation thereof.

However, with the apparatus constructed in this manner, the battery will be possibly discharged through the average voltage detection circuit that is always connected to both ends of the battery when the generator stops the operation thereof. The first switch control section is required to be provided in order to avoid this.

As apparent from the foregoing, the first switch control section 10 is required to have such a construction as can prevent the battery from being discharged when the generator stops the operation.

In the embodiment shown in FIG. 1, the overvoltage detection circuit 6 may comprise the first voltage divider resistor R1 having the one end connected to the positive terminal of the battery, the Zener diode ZD1 connected in series to the first voltage divider resistor R1 with the anode faced to the negative terminal of the battery between the first voltage divider resistor and the battery and the second voltage divider resistor R2 connected in series to the Zener diode and the first voltage divider between the other end of the first voltage divider resistor and the negative terminal of the battery so as to generate the overvoltage detection signal by conducting the Zener diode when the instantaneous value of the terminal voltage of the battery exceeds the first set value. Thus, it will be noted that the use of the overvoltage detection circuit can prevent the battery from being discharged in the condition that the generator stops the operation.

In case that the diode bridge type full-wave rectifier circuit as shown in FIG. 1 is used for rectifying the output of the magneto AC generator, the switch elements of the output short circuit are used between the respective AC input terminals of the rectifier circuit and the negative DC output terminal thereof Even in case that the generator is constructed so as to generate a single phase AC output, at least two switch elements of the output short circuit should be provided because the rectifier circuit has the two AC input terminals.

There has no problem in case that the peak values of two half waves of the AC output generated by the generator are equal to each other, but if the peak values thereof sequentially appearing from the generator are possibly different from each other, the switch element shorting the half wave having the higher peak value is turned on prior to the other switch elements. This causes the particular switch element to be used more frequently and therefore the life span of the switch element will be disadvantageously shorter.

In order to avoid the disadvantages, all the switch elements of the output short circuit are preferably turned on when the average value of the battery terminal voltage exceeds the second set value in spite of the difference between the peak values of the half waves of the AC output from the generator.

In the aforementioned embodiment, the second switch control section 14 is provided with the microcomputer that makes a comparatively arithmetical operation of the average value of the battery terminal voltage detected by the average voltage detection circuit and the second set value to repetitively generate from the microcomputer the on-instruction signal of frequency (clock frequency of the microcomputer) sufficiently higher than the frequency of the generator output. While the on-instruction signal is generating, the signals for turning on the switch elements of the output short circuit are repetitively applied to the respective switch elements.

In this manner, even though the peak values of the half waves of the AC output from the generator are different from each other or the three phase outputs of FIG. 1 are unbalanced, all the switch elements are turned on when the average value of the battery terminal voltage exceeds the second set value and therefore the life span of the particular switch elements can be prevented from being shortened.

In case that the set value arithmetical operation means or the set value change-over means are provided that changes the second set value in accordance with the various conditions, the upper limit of the set value is properly determined within the range over which the battery and the load are not adversely affected. The first set value is set so as to get higher than the instantaneous value of the battery terminal voltage when the average value of the battery terminal voltage reaches the maximum value of the second set value.

In case that there may be a plurality of means to change the second set value in accordance with the control conditions, the conditions to determine the second set value have priority order given. When the condition for increasing the second set value and the condition for decreasing the second set value are overlapped, the condition having the higher priority order is selected. For example, when the engine is detected to be at the deceleration state in the condition where the temperature of the lubrication oil increases, the second set value is changed to a higher value in order to protect the generation coil with priority.

Figure 2:
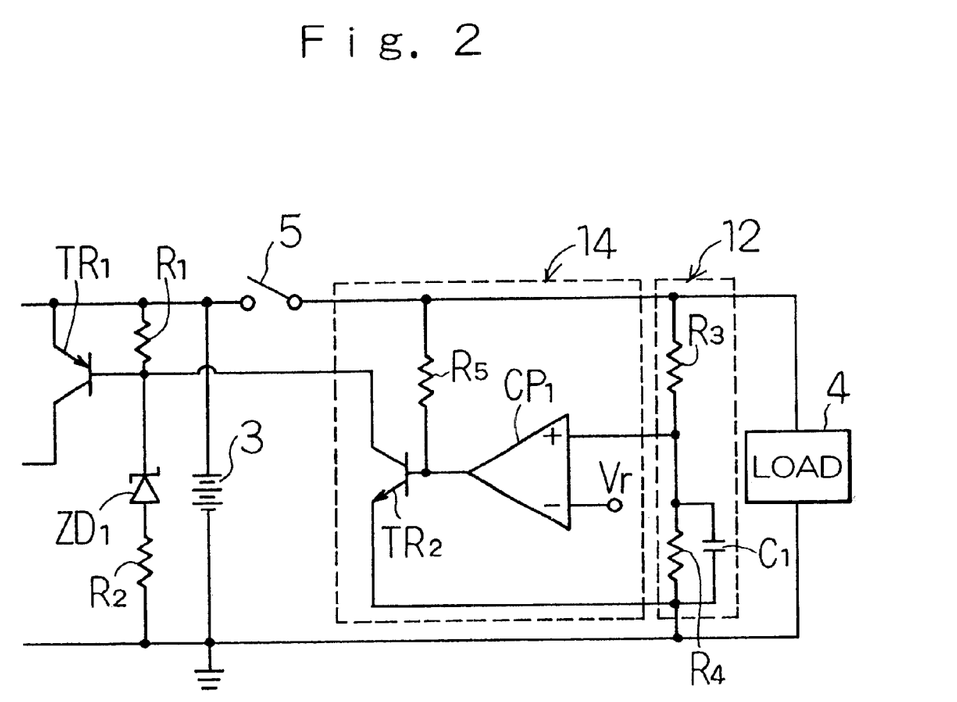
FIG. 2 is a schematic diagram of a modified second switch control section for the battery charging apparatus of FIG. 1.

Although, in the aforementioned embodiment, the second switch control section is provided with the CPU that arithmetically compares the average value of the battery terminal voltage with the second set value, a comparator may be alternatively provided in the second switch control section that serves to compare the average value of the battery terminal voltage with the second set value. For instance, as shown in FIG. 2, a comparator CP1 having an output step of open collector type may be provided in place of the CPU 13 of the circuit of FIG. 1. The comparator CP1 has a non-inversion input terminal and an inversion terminal to which a voltage across a capacitor C1 (corresponding to the average value of the battery terminal voltage) and a reference voltage Vr providing the second set value are input, respectively and an output terminal connected to a base of a transistor TR2 and also connected through a resistor R5 to the positive terminal of the battery 3.

With the apparatus constructed as shown in FIG. 2, the potential of the output terminal of the comparator CP1 is substantially equal to the grounded potential when the average value of the battery terminal voltage is equal to or less than the second set value and therefore the transistor TR2 has no base current flowing through the base thereof. Thus, since the transistor TR1 is kept at the off-state, no trigger signal is applied to the thyristors Thu though Thw. As the average value of the battery terminal voltage exceeds the second set value, the output terminal of the comparator CP1 is released from the grounded earth and therefore the base of the transistor TR2 has the base current flowing through the resistor R5. This turns on the transistor TR1 and the trigger signal is applied to the thyristors Thu through Thw.

Although, in the embodiment of FIG. 1, the invention may be applied to the generator constructed to generate the three-phase AC output, it may be also applied to the magneto generator that is constructed to generate the single phase AC output.

Also in the illustrated embodiment, although the invention is applied to the apparatus having the full-wave rectifier circuit used for rectifying the AC output of the generator, it may be applied to the apparatus having a half wave rectifier circuit used.

Although, in the illustrated embodiment, the power source switch 5 serves as the control change-over means to change the controls of the first and second switch control sections so that the switch elements Thu through Thw are controlled by the second switch control section 14 when the electric power is supplied from the battery 3 to the load by the power source switch 5 while they are controlled by the first switch control section 10 when the load 4 is cut from the battery 3, it should be noted that the control change-over means is never limited thereto. For instance, in FIG. 1, the average voltage detection circuit 12 may be disposed between the battery 3 and the power source switch 5 and the control changing switch forming the control change-over means may be provided in series to the resistors R3 and R4 of the detection circuit 12 so that the control changing switch is turned on when the load current is detected while the control changing switch is turned off when the load current is not detected whereby the controls by the first and second switch control sections may be changed in accordance with the presence of the load current.

According to the invention, since the average value of the battery terminal voltage is detected when the magneto AC generator is steadily operated and the charging voltage is adjusted not so as to exceed the average set value, the battery charging voltage can be advantageously controlled without being affected by such a ripple voltage as has the peak value changed in accordance with variation in the revolution of the generator. Also, since the voltage adjustment is never affected by the ripple voltage, the constant of the circuit is never adjusted in accordance with the specification of the generator, the capacity of the battery, the kind of the load and so on, the battery charging apparatus can be more easily manufactured.

Furthermore, according to the invention, with the second set value properly set, even though the circuit impedance between the rectifier circuit and the battery is high, the voltage adjustment is never affected by the variation in the rising portion of the ripple voltage and therefore the charging voltage can be kept within the appropriate range not only at the low speed rotation of the generator, but also at the high speed rotation thereof. Thus, it will be noted that the battery has no shortage of charge.

Although some preferred embodiments of the invention have been described and illustrated with reference to the accompanying drawings, it will be understood by those skilled in the art that the are by way of example, and that various changes and modifications may be made without departing from the spirit and scope of the invention, which is defined only to the appended claims.

What is claimed is:

1. A battery charging apparatus comprising a magneto AC generator, a rectifier circuit having input terminals connected to output terminals of said generator and output terminals to which a battery is connected, an output short circuit having on-off controllable switch elements and shorting said output terminals of said magneto AC generator when said switch elements are at an on state and a controller to control said switch elements of said output short circuit in accordance with a terminal voltage of said battery, said controller including a first switch control section to control said switch elements of said output short circuit to be turned on when an instantaneous value of said terminal voltage of said battery exceeds a first set value, an average voltage detection circuit to detect an average value of said terminal voltage of said battery, a second switch control section to control said switch elements of said output short circuit to be turned on when said average value of said terminal voltage of said battery exceeds a second set value and control change-over means to change controls by said first control section and said second control sections so that said switch elements are controlled by said second control section when an electric power is supplied from said battery to a load and so that said switch elements are controlled by said first control section when said load is cut from said battery.

2. A battery charging apparatus comprising a magneto AC generator, a rectifier circuit having input terminals connected to output terminals of said generator and output terminals to which a battery is connected, an output short circuit having on-off controllable switch elements and shorting said output terminals of said magneto AC generator when said switch elements are at an on-state and a controller to control said switch elements of said output short circuit in accordance with a terminal voltage of said battery, said controller including a first switch control section to control said switch elements of said output short circuit to be turned on when an instantaneous value of said terminal voltage of said battery detected at both ends of said battery exceeds a first set value, an average voltage detection circuit to detect an average value of said terminal voltage of said battery at both ends of a load connected through a power source switch to said battery and a second switch control section to control said switch elements of said output short circuit to be turned on when said average value of said terminal voltage of said battery exceeds a second set value, said first set value is set within a range over which said battery and said load are not adversely affected, so as to be higher than said instantaneous value of said terminal voltage of said battery when said average value of said terminal voltage of said battery reaches said second set value.

3. A battery charging apparatus as set forth in claim 1 or 2 and wherein an internal combustion engine is used as a power source for driving said magneto generator and wherein said controller further includes acceleration state detection means to detect an acceleration state of said internal combustion engine from a revolution of said internal combustion engine and an opening degree of a throttle and set value change-over means to change said second set value to a higher value when said acceleration state detection means detects said acceleration state of said internal combustion engine.

4. A battery charging apparatus as set forth in claim 1 or 2 and wherein an internal combustion engine is used as a power source for driving said magneto generator and said controller further including deceleration state detection means to detect a deceleration state of said internal combustion engine from a revolution of said internal combustion engine and an opening degree of a throttle and set value change-over means to change said second set value to a lower value when said deceleration state detection means detects said deceleration state of said internal combustion engine.

5. A battery charging apparatus as set forth in claim 1 or 2 and wherein an internal combustion engine is used as a power source for driving said magneto generator and said controller further including acceleration/deceleration state detection means to detect an acceleration state of said internal combustion engine and a deceleration thereof from a revolution of said internal combustion engine and an opening degree of a throttle and set value change-over means to change said second set value to a higher value when said acceleration/deceleration state detection means detects said acceleration state of said internal combustion engine and to change said second set value to a lower value when said acceleration/deceleration state detection means detects said deceleration state of said internal combustion engine.

6. A battery charging apparatus as set forth in claim 1 or 2 and wherein an internal combustion engine is used as a power source for driving said magneto generator while coils of said generator are constructed so as to be cooled by a lubrication oil of said internal combustion engine and said controller further including oil temperature detection means to detect a temperature of said lubrication oil of said internal combustion engine and set value change-over means to change said second value to a higher value when said temperature detected by said oil temperature detection means exceeds a set value.

7. A battery charging apparatus comprising a magneto AC generator, a rectifier circuit having input terminals connected to output terminals of said generator and output terminals to which a battery is connected, an output short circuit having on-off controllable switch elements and shorting said output terminals of said magneto AC generator when said switch elements are at an on-state and a controller to control said switch elements of said output short circuit in accordance with a terminal voltage of said battery, said controller including a first switch control section to control said switch elements of said output short circuit to be turned on when an instantaneous value of said terminal voltage of said battery exceeds a first set value, an average voltage detection circuit to detect an average value of said terminal voltage of said battery, set value arithmetical operation means to arithmetically operate a second set value providing a limit value of said average value of said battery terminal voltage in accordance with an atmospheric temperature of said battery, a second switch control section to control said switch elements of said output short circuit to be turned on when said average value of said terminal voltage of said battery exceeds said second set value and control change-over means to change controls by said first control section and said second control sections so that said switch elements are controlled by said second control section when an electric power is supplied from said battery to a load and so that said switch elements are controlled by said first control section when said load is cut from said battery and said set value arithmetical operation means being constructed so that said second set value gets higher when said atmospheric temperature is low and gets lower as said atmospheric temperature increases.

8. A battery charging apparatus comprising a magneto AC generator, a rectifier circuit having input terminals connected to output terminals of said generator and output terminals to which a battery is connected, an output short circuit having on-off controllable switch elements and shorting said output terminals of said magneto AC generator when said switch elements are at an on-state and a controller to control said switch elements of said output short circuit in accordance with a terminal voltage of said battery, said controller including a first switch control section to control said switch elements of said output short circuit to be turned on when said terminal voltage of said battery detected at both ends of said battery exceeds a first set value, an average voltage detection circuit to detect an average value of said terminal voltage of said battery at both ends of a load connected through a power source switch to said battery, set value arithmetical operation means to arithmetically operate a second set value providing a limit value of said average value of said battery terminal voltage in accordance with an atmospheric temperature of said battery and a second switch control section to control said switch elements of said output short circuit to be turned on when said average value of said terminal voltage of said battery detected by said average voltage detection circuit exceeds said second set value, said first set value is set within a range over which said battery and said load are not adversely affected, so as to be higher than said instantaneous value of said terminal voltage of said battery when said average value of said terminal voltage of said battery reaches a maximum value of said second set value.

9. A battery charging apparatus as set forth in either of claims 1, 2, 7 and 8 and wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor to generate an overvoltage detection signal by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal.

10. A battery charging apparatus as set forth in claim 1 or 2 and wherein an internal combustion engine is used as a power source for driving said magneto generator and said controller further including acceleration state detection means to detect an acceleration state of said internal combustion engine from a revolution of said internal combustion engine and an opening degree of a throttle and set value change-over means to change said second set value to a higher value when said acceleration state detection means detects said acceleration state of said internal combustion engine and wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor to generate an overvoltage detection signal by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal.

11. A battery charging apparatus as set forth in claim 1 or 2 and wherein an internal combustion engine is used as a power source for driving said magneto generator and said controller further including deceleration state detection means to detect a deceleration state of said internal combustion engine from a revolution of said internal combustion engine and an opening degree of a throttle and set value change-over means to change said second set value to a lower value when said deceleration state detection means detects said deceleration state of said internal combustion engine and wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal.

12. A battery charging apparatus as set forth in claim 1 or 2 and wherein an internal combustion engine is used as a power source for driving said magneto generator and said controller further including acceleration/deceleration state detection means to detect an acceleration state of said internal combustion engine and a deceleration thereof from a revolution of said internal combustion engine and an opening degree of a throttle and set value change-over means to change said second set value to a higher value when said acceleration/deceleration state detection means detects said acceleration state of said internal combustion engine and to change said second set value to a lower value when said acceleration/deceleration state detection means detects said deceleration state of said internal combustion engine and wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal.

13. A battery charging apparatus as set forth in claim 1 or 2 and wherein an internal combustion engine is used as a power source for driving said magneto generator while coils of said generator is constructed to be cooled by a lubrication oil of said internal combustion engine and said controller further including oil temperature detection means to detect a temperature of said lubrication oil of said internal combustion engine and set value change-over means to change said second value to a higher value when said temperature detected by said oil temperature detection means exceeds a set value and wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal.

14. A battery charging apparatus as set forth in either of claims 1,2, 7 and 8 and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on-instruction signal is generating.

15. A battery charging apparatus as set forth in claim 1 or 2 and wherein an internal combustion engine is used as a power source for driving said magneto generator and wherein said controller further includes acceleration state detection means to detect an acceleration state of said internal combustion engine from a revolution of said internal combustion engine and an opening degree of a throttle and set value change-over means to change said second set value to a higher value when said acceleration state detection means detects said acceleration state of said internal combustion engine and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on-instruction signal is generating.

16. A battery charging apparatus as set forth in claim 1 or 2 and wherein an internal combustion engine is used as a power source for driving said magneto generator and said controller further including deceleration state detection means to detect a deceleration state of said internal combustion engine from a revolution of said internal combustion engine and an opening degree of a throttle and set value change-over means to change said second set value to a lower value when said deceleration state detection means detects said deceleration state of said internal combustion engine and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on-instruction signal is generating.

17. A battery charging apparatus as set forth in claim 1 or 2 and wherein an internal combustion engine is used as a power source for driving said magneto generator and said controller further including acceleration/deceleration state detection means to detect an acceleration state of said internal combustion engine and a deceleration thereof from a revolution of said internal combustion engine and an opening degree of a throttle and set value change-over means to change said second set value to a higher value when said acceleration/deceleration state detection means detects said acceleration state of said internal combustion engine and to change said second set value to a lower value when said acceleration/deceleration state detection means detects said deceleration state of said internal combustion engine and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on-instruction signal is generating.

18. A battery charging apparatus as set forth in claim 1 or 2 and wherein an internal combustion engine is used as a power source for driving said magneto generator while coils of said generator are constructed so as to be cooled by a lubrication oil of said internal combustion engine and said controller further including oil temperature detection means to detect a temperature of said lubrication oil of said internal combustion engine and set value change-over means to change said second value to a higher value when said temperature detected by said oil temperature detection means exceeds a set value and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on-instruction signal is generating.

19. A battery charging apparatus as set forth in claim 1 or 2 and wherein an internal combustion engine is used as a power source for driving said magneto generator and said controller further including acceleration state detection means to detect an acceleration state of said internal combustion engine from a revolution of said internal combustion engine and an opening degree of a throttle and set value change-over means to change aid second set value to a higher value when said acceleration state detection means detects said acceleration state of said internal combustion engine, wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor to generate an overvoltage detection signal by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on instruction signal is generating.

20. A battery charging apparatus as set forth in claim 1 or 2 and wherein an internal combustion engine is used as a power source for driving aid magneto generator and said controller further including deceleration state detection means to detect a deceleration state of said internal combustion engine from a revolution of said internal combustion engine and an opening degree of a throttle and set value change-over means to change said second set value to a lower value when said deceleration state detection means detects said deceleration state of said internal combustion engine, wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal by conducting said overvoltage detection signal and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on instruction signal is generating.

21. A battery charging apparatus as set forth in claim 1 or 2 and wherein an internal combustion engine is used as a power source for driving said magneto generator and said controller further including acceleration/deceleration state detection means to detect an acceleration state of said internal combustion engine and a deceleration thereof from a revolution of said internal combustion engine and an opening degree of a throttle and set value change-over means to change said second set value to a higher value when said acceleration/deceleration state detection means detects said acceleration state of said internal combustion engine and to change said second set value to a lower value when said acceleration/deceleration state detection means detects said deceleration state of said internal combustion engine, wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically cally compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on instruction signal is generating.

22. A battery charging apparatus as set forth in claim 1 or 2 and wherein an internal combustion engine is used as a power source for driving said magneto generator while coils of said generator is constructed to be cooled by a lubrication oil of said internal combustion engine and said controller further including oil temperature detection means to detect a temperature of said lubrication oil of said internal combustion engine and set value change-over means to change said second set value to a higher value when said temperature detected by said oil temperature detection means exceeds a set value, wherein said first switch control section comprises an overvoltage detection circuit including a first voltage divider resistor having one end connected to a positive terminal of said battery, a Zener diode provided between said first voltage divider resistor and a negative terminal of said battery with an anode faced to said negative terminal of said battery and connected in series to said first voltage divider resistor and a second voltage divider resistor provided between the other end of said first voltage divider resistor and said negative terminal of said battery and connected in series to said Zener diode and said first voltage divider resistor by conducting said Zener diode when said instantaneous value of said battery terminal voltage exceeds said first set value and a switch element trigger circuit to apply a switch trigger signal to said switch elements of said output short circuit for turning them on when said overvoltage detection circuit generates said overvoltage detection signal and wherein said rectifier circuit comprises a diode bridge type full wave rectifier circuit, said switch elements of said output short circuit being connected between respective AC input terminals of said rectifier circuit and a negative one of DC output terminals thereof, said second switch control section comprising a microcomputer to arithmetically compare said average value of said terminal voltage detected by said average voltage detection circuit and said second set value whereby said microcomputer repetitively generates an on-instruction signal of frequency sufficiently higher than an output frequency of said generator while said average value of said terminal voltage exceeds said second set value and a signal making an on-state of said respective switch elements is repetitively applied to said switch elements while said on instruction signal is generating.

* * * * *